(12) United States Patent
Snijders et al.

(10) Patent No.: US 7,748,754 B2
(45) Date of Patent: Jul. 6, 2010

(54) PIPE SECTION PROVIDED WITH A SOCKET END PART

(75) Inventors: Johannes Hendrikus Gerhardus Snijders, Tubbergen (NL); Berend Jan van Dijk, Slagharen (NL)

(73) Assignee: Wavin B.V., Zwolle (NL)

( * ) Notice: Subject to any disclaimer, the term of this patent is extended or adjusted under 35 U.S.C. 154(b) by 0 days.

(21) Appl. No.: 11/661,985

(22) PCT Filed: Aug. 10, 2005

(86) PCT No.: PCT/NL2005/000585

§ 371 (c)(1),
(2), (4) Date: Jan. 25, 2008

(87) PCT Pub. No.: WO2006/028365

PCT Pub. Date: Mar. 16, 2006

(65) Prior Publication Data

US 2008/0191469 A1    Aug. 14, 2008

(30) Foreign Application Priority Data

Sep. 8, 2004    (NL) .................................... 1026990

(51) Int. Cl.
*F16L 17/00* (2006.01)
(52) U.S. Cl. ....................... 285/374; 285/399
(58) Field of Classification Search ................. 285/374, 285/399, 920, 184, 903, 133.3, 234; 138/109; 29/512
See application file for complete search history.

(56) References Cited

U.S. PATENT DOCUMENTS

| | | | | |
|---|---|---|---|---|
| 1,234,609 A | * | 7/1917 | Bernard | 285/399 |
| 2,315,792 A | | 4/1943 | Hoss | |
| 3,066,959 A | * | 12/1962 | White | 285/399 |
| 3,304,104 A | * | 2/1967 | Wiltse | 285/234 |
| 3,638,973 A | * | 2/1972 | Poletti | 285/184 |
| 3,695,643 A | * | 10/1972 | Schmunk | 285/133.3 |
| 3,831,954 A | | 8/1974 | Longfellow | |
| 3,958,425 A | * | 5/1976 | Maroschak | 285/903 |
| 5,071,173 A | * | 12/1991 | Hegler et al. | 285/399 |
| 5,116,087 A | * | 5/1992 | Hopperdietzel | 285/399 |
| 7,363,945 B2 | * | 4/2008 | Saha et al. | 138/109 |

FOREIGN PATENT DOCUMENTS

WO    WO 2004/029499 A1    4/2004

OTHER PUBLICATIONS

International Search Report, Jul. 11, 2005.

* cited by examiner

*Primary Examiner*—Aaron M Dunwoody
(74) *Attorney, Agent, or Firm*—Wolf, Greenfield & Sacks, P.C.

(57) ABSTRACT

A pipe section provided with a socket end part for accommodating a spigot end part of a second pipe section, the spigot end part having a sealing ring and the socket end part configured with an obliquely tapered part having areas of varying dimension for deforming the sealing ring to differing extent along the circumference of the sealing ring when the socket end part engages the spigot end part.

6 Claims, 3 Drawing Sheets

PIPE SECTION PROVIDED WITH A SOCKET
END PART

BACKGROUND OF THE INVENTION

Field of the Invention

The invention relates to a pipe section provided with a socket end part which is intended for accommodating a spigot end part of a second pipe section, the exterior of the spigot end part being provided with a sealing ring and the interior of the socket end part, viewed from the end edge, having a part obliquely tapering towards the centre axis of the socket end part for deforming the sealing ring when the spigot end part and an adjoining cylindrical part are inserted into the socket end part, the part of the socket end part obliquely tapering towards the centre axis having at least two areas distributed regularly over the circumference in which the angle of the obliquely tapering part varies relative to the centre axis of the socket end part in the circumferential direction, in such a manner that in each area, along the sides of the area, the obliquely tapering part, viewed in the circumferential direction, is at a first angle relative to the centre axis of the socket end part and, in the centre of the area, is at least partly at a second angle relative to the centre axis of the socket end part which is smaller than the first angle.

A pipe section of this type is known from U.S. Pat. No. 3,831,954, in particular FIGS. 8 and 10.

Well-known pipe sections, in which the obliquely tapering part extends parallel to a plane at right angles to the centre axis of the pipe section, have the disadvantage that when a spigot end part which is provided with a sealing ring is inserted into the socket end part, the insertion force is in many cases considered to be undesirably great. The great insertion force results from the fact that when the spigot end part is inserted, the sealing ring has to be deformed over the entire circumference at the same time, which generally involves having to reduce the sealing ring's outer diameter. U.S. Pat. No. 3,831,954 (FIG. 8-10) proposes two solutions to this problem. With the first solution (FIG. 9), the axial position of the obliquely tapering part varies over the circumference of the socket end part. The obliquely tapering part is corrugated in the axial direction. With the second solution (FIG. 10), the pitch varies and thus also the length of the obliquely tapering part over the circumference of the socket end part.

BRIEF SUMMARY OF THE INVENTION

It is an object of the invention to provide an improved pipe section of the type mentioned in the introduction.

This object is achieved according to the invention with a pipe section of the type mentioned in the introduction by the fact that, between the sides and the centre of each area, the obliquely tapering part is at the first angle in a part which is situated on the side of the end edge of the socket end part and at the second angle in an adjoining part on the side of the cylindrical part of the socket end part relative to the centre axis, the axial length of the part at the second angle gradually increasing from the sides towards the centre of the area.

Through the measures according to the invention, the insertion force required for inserting the spigot end part into the socket end part is reduced further. In addition, the pipe section can be produced using a simpler die than in the case of the pipe sections with socket end parts according to FIG. 8-10 of U.S. Pat. No. 3,831,954.

Preferred embodiments of the pipe section according to the invention are defined in the subclaims.

BRIEF DESCRIPTION OF THE DRAWINGS

The invention will be described in more detail below by way of a number of exemplary embodiments with reference to the drawing, in which.

DETAILED DESCRIPTION OF THE INVENTION

Figure 1:
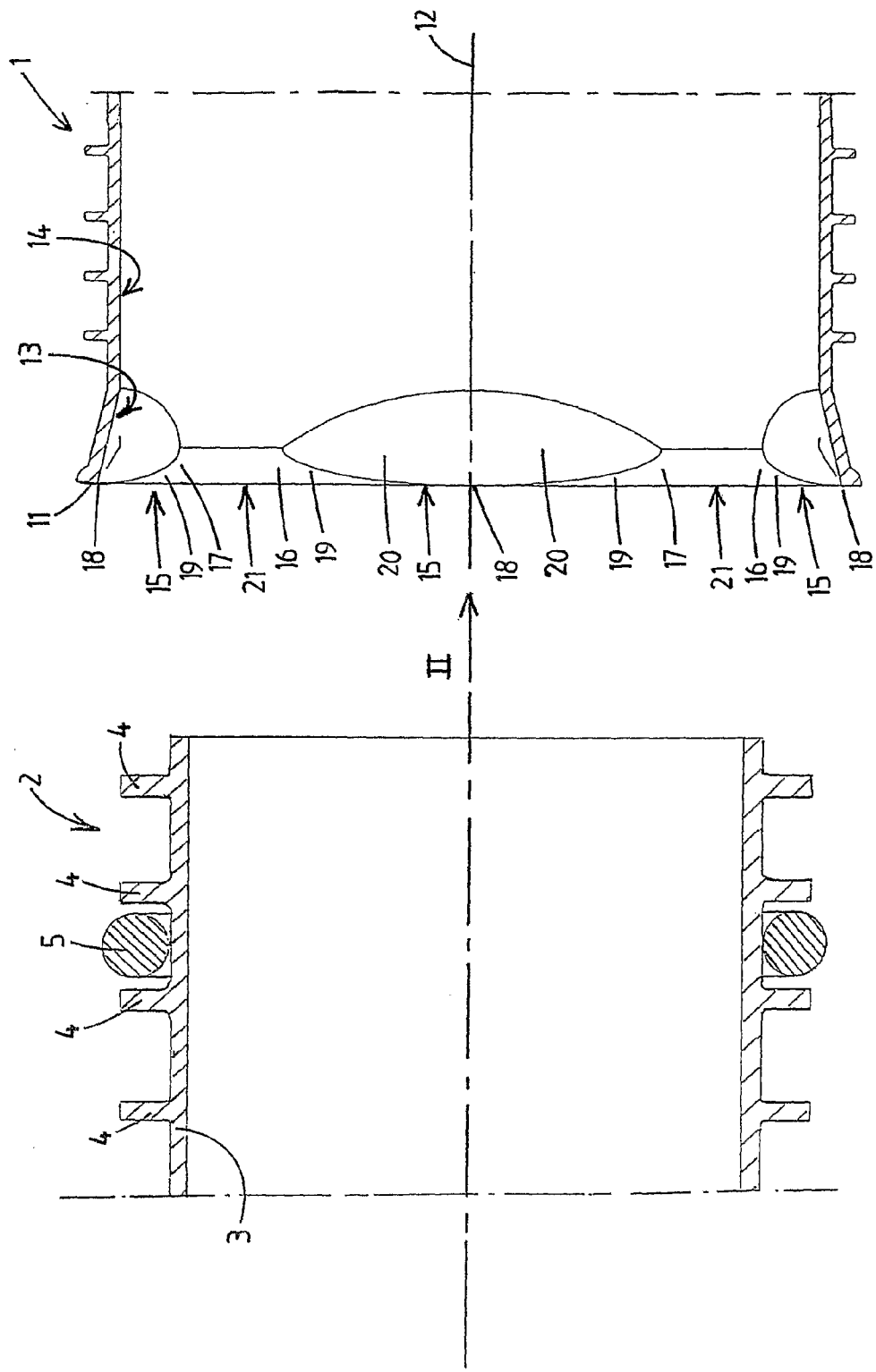
FIG. 1 shows a longitudinal view of a specific embodiment of a socket end part of a pipe section according to the invention and an associated spigot end part of a second pipe section.

FIG. 1 shows a longitudinal view of a specific embodiment of a socket end part 1 of a first pipe section according to the invention and an associated spigot end part 2 which has to be inserted into the socket end part 1 in order to form a pipe connection between the first pipe section and the second pipe section.

In the embodiment shown, the spigot end part 2 is an end part of a pipe section with a relatively thin wall 3 which is provided on the outside with circumferential ribs 4. A sealing ring 5 is arranged between two ribs 4. However, the spigot end part may also have another shape, for example be designed to have a thick wall, in which case the sealing ring is disposed in a circumferential groove arranged on the exterior in the wall.

The interior of the socket end part 1 has, viewed from the end edge 11, a part 13 obliquely tapering towards the centre axis 12 of the socket end part 1 in order to reduce the outer diameter of the sealing ring 5 when the spigot end part 2 and an adjoining cylindrical part 14 are inserted into the socket end part 1.

Figure 4:
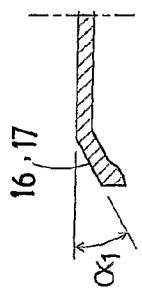
FIG. 4 to 7 inclusive show an end part of the wall of the socket end part from FIG. 1 in longitudinal sections along the lines IV-IV, V-V, VI-VI and VII-VII in FIG. 2.
Figure 7:
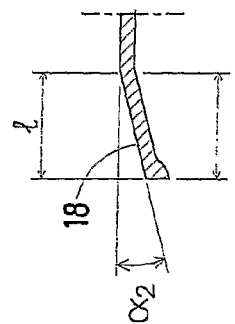
Figure 3:
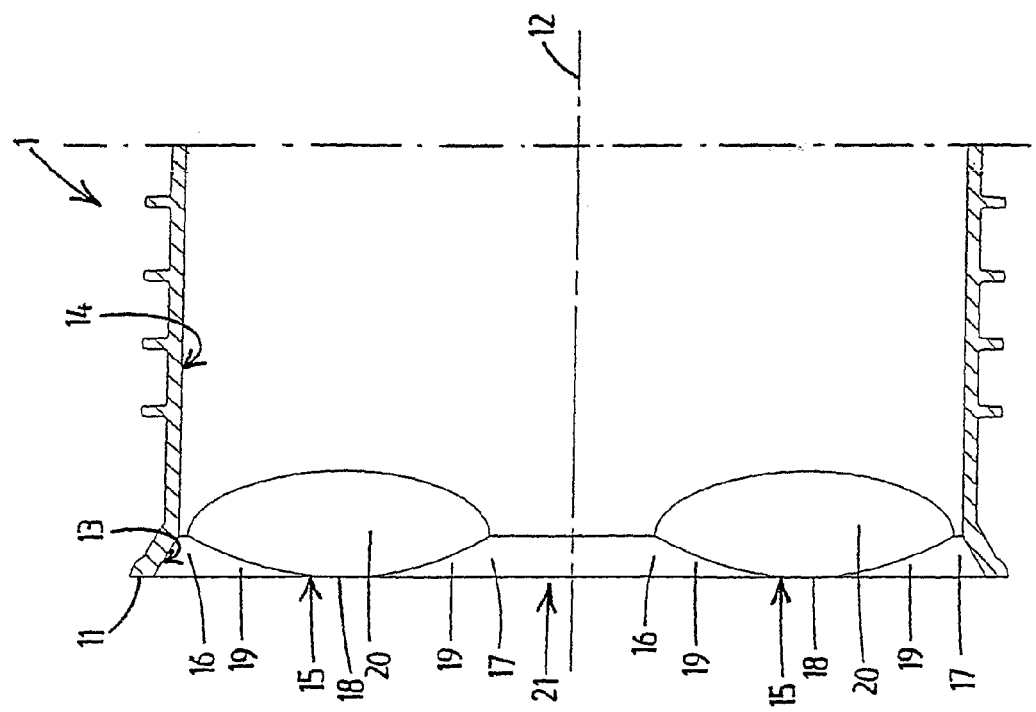
FIG. 3 shows the socket end part from FIG. 1 in a longitudinal view along the line III-III in FIG. 2.

The obliquely tapering part 13 of the socket end part 1 has at least two areas 15 distributed regularly over the circumference in which the angle of the obliquely tapering part 13 varies relative to the centre axis 12 of the socket end part 1 in the circumferential direction. In each area 15, along the sides 16 and 17 of the area 15, the obliquely tapering part 13, viewed in the circumferential direction, is at a first angle α1 relative to the centre axis 12 of the socket end part 1 (see FIG. 4) and, in the centre 18 of the area 15, is at least partly at a second angle α2 relative to the centre axis 12 of the socket end part 1 which is smaller than the first angle α1 (see FIG. 7). In the embodiment shown, the obliquely tapering part is at the second angle α2 relative to the centre axis 12 of the socket end part 1 in the centre 18 of each area 15.

Figure 5:
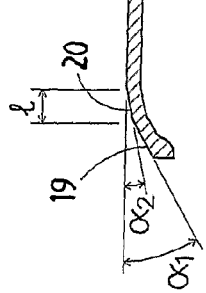
Figure 6:
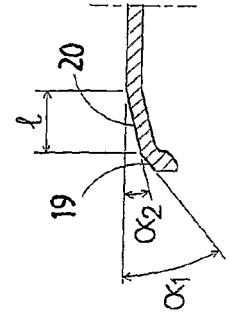

Between the sides 16 and 17 and the centre 18 of each area 15, the obliquely tapering part is in a part 19 situated on the side of the end edge 11 of the socket end part 1 at the first angle α1 and in an adjoining part 20 situated at the side of the cylindrical part 14 of the socket end part 1 at the second angle α2 relative to the centre axis 12 (see FIGS. 5 and 6). In this case, the axial length l of the part 20 which is at the second angle α2 gradually increases from the sides 16 and 17 towards the centre 18 of the area 15.

Between the areas 15 with a varying angle, there are areas 21 in which the obliquely tapering part is at the first angle α1 relative to the centre axis 12.

Figure 2:
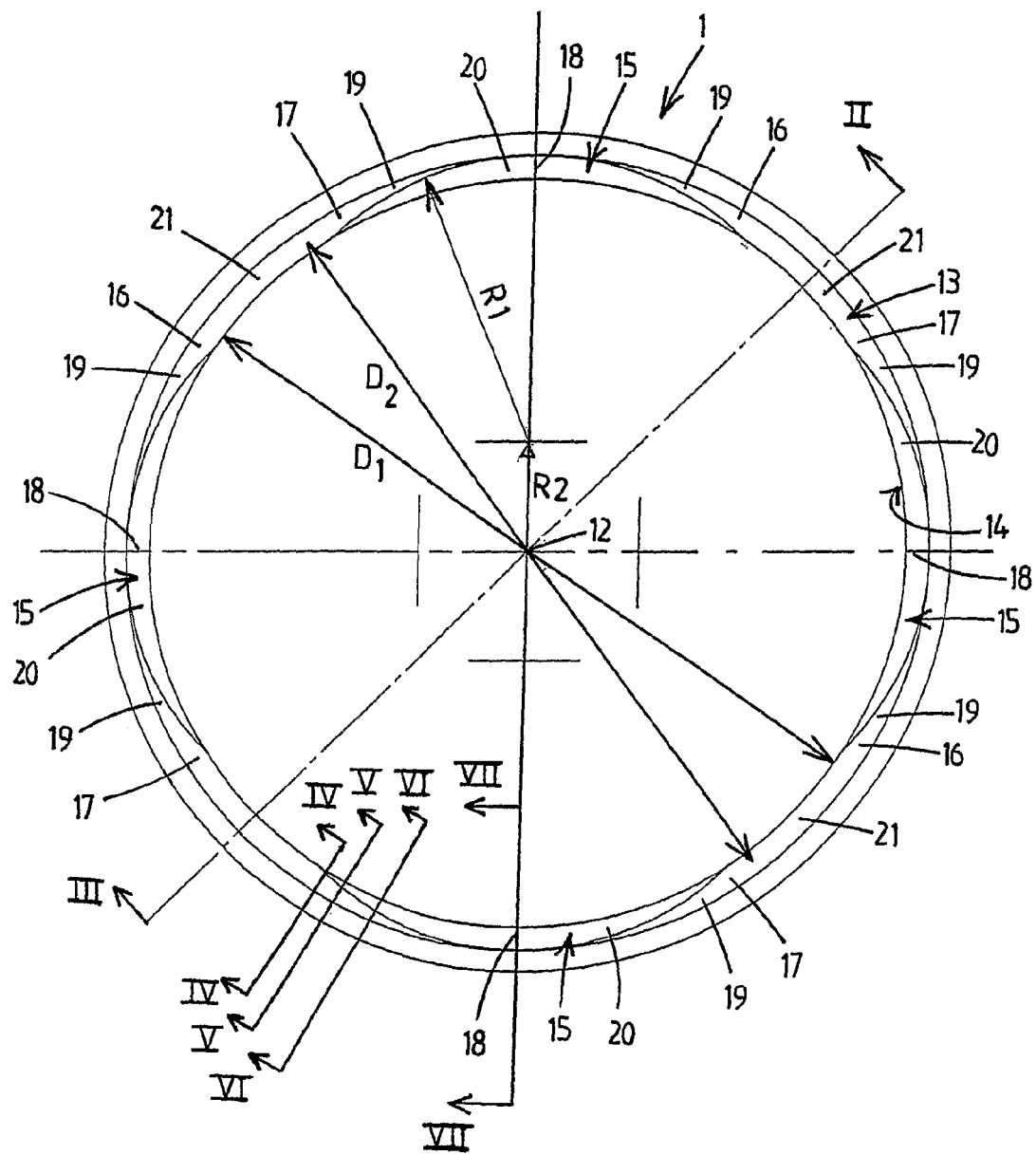
FIG. 2 shows a head end view of the socket end part from FIG. 1, viewed in the direction of the arrow II in FIG. 1.

The following applies with regard to the dimensions of the areas 15 of the socket end part 1 (see FIG. 2). With an internal diameter D1 of the cylindrical part 14 of the socket end part 1 and an internal diameter D2 of the obliquely tapering part 13 at the location of the end edge 11 with the configuration of the angles α1 and α2 described above, the part which is at an angle α2 at the location of the end edge 11 has a radius R1. The radius R1 starts from a point which is at a distance R22 from the centre axis 12 of the socket end part. In this case, the following applies:

R1=(0.25 to 0.5)D1, preferably (0.3 to 0.35)D1, at the end edge 11 of the socket end part, α2=(0.3 to 0.5) α1,

R1+R2=0.5D2, the areas 21 which are at an angle α1 should occupy less than 30% of the circumference of the socket end part (this obviously depends on the choice for R1), preferably, the transition from the obliquely tapering part 13 to the cylindrical part 14 is provided with a rounding having a radius of 3 to 10 mm.

Using the above-described socket end part results in the sealing ring 5 being deformed in sections when the spigot end part 2 is being inserted and, in the embodiment shown, the outer diameter of the sealing ring 5 is reduced in sections, as a result of which the associated required force can be applied distributed over time and the required insertion force can be reduced.

The socket end part 1 may be of a different design to that described above while still remaining within the scope of the attached claims.

The invention claimed is:

1. A pipe section provided with a socket end part (1) which is adapted for accommodating a spigot end part (2) of a second pipe section, wherein the exterior of the spigot end (2) is provided with a sealing ring (5), the interior of the socket end part (1), viewed from the end edge (11) of the socket end part (1), having an obliquely tapering part (13), which extends along the circumference of the interior of the socket end part (1) and is obliquely tapering towards the center axis (12) of the socket end part (1) for deforming the sealing ring (5) when the spigot end part (2) is inserted into the socket end part (1), the interior of the spigot end part (1) having an adjoining cylindrical part (14), further inwards from said end edge (11) than said obliquely tapering part (13) and adjoining the obliquely tapering part (13), the obliquely tapering part (13) having at least two areas (15) distributed regularly over the circumference of the obliquely tapering part (13), each of said areas (15) having—when viewed in circumferential direction—a center (18) and sides (16, 17), wherein along each of the sides (16, 17) of the area (15), the obliquely tapering part (13) is at a first angle (α1) relative to the center axis (12) of the socket end part (1), and wherein in the center (18) of the area (15), the obliquely tapering part (13) is at least partly at a second angle (α2) relative to the center axis (12) of the socket end part, and wherein the second angle (α2) is smaller than the first angle (α1), wherein in a part (19) which is situated adjacent the end edge (11), which part (19) extends between each of the sides (16, 17) and the center (18) of each area (15), the obliquely tapering part (13) is arranged at the first angle (α1), and in that in an adjoining part (20), which adjoining part (20) adjoins said part (19) on the side of the cylindrical part (14) of the socket end part, the obliquely tapering part (13) is arranged at the second angle (α2), and in that the axial length (l) of the adjoining part (20) arranged at the second angle (α2) gradually increases from each of the sides (16, 17) towards the center (18) of the area (15).

2. Pipe section according to claim 1, in which an adjoining part (20)—at the center (18) of the area (15)—adjoins the free edge (11) of the socket end part (1).

3. Pipe section according to claim 1, in which the obliquely tapering part (13) is at the first angle (α1) relative to the center axis (12) in areas (21) that are located between neighboring areas (15) when seen in circumferential direction.

4. An assembly comprising:

a pipe section provided with a socket end part (1); and a second pipe section provided with a spigot end part (2), wherein the socket end part (1) is adapted for accommodating the spigot end part (2) of the second pipe section, and wherein the exterior of the spigot end (2) is provided with a sealing ring (5), the interior of the socket end part (1), viewed from the end edge (11) of the socket end part (1), having an obliquely tapering part (13), which extends along the circumference of the interior of the socket end part (1) and is obliquely tapering towards the center axis (12) of the socket end part (1) for deforming the sealing ring (5) when the spigot end part (2) is inserted into the socket end part (1), the interior of the spigot end part (1) having an adjoining cylindrical part (14), further inwards from said end edge (11) than said obliquely tapering part (13) and adjoining the obliquely tapering part (13), the obliquely tapering part (13) having at least two areas (15) distributed regularly over the circumference of the obliquely tapering part (13), each of said areas (15) having—when viewed in circumferential direction—a center (18) and sides (16, 17), wherein along each of the sides (16, 17) of the area (15), the obliquely tapering part (13) is at a first angle (α1) relative to the center axis (12) of the socket end part (1), and wherein in the center (18) of the area (15), the obliquely tapering part (13) is at least partly at a second angle (α2) relative to the center axis (12) of the socket end part, and wherein the second angle (α2) is smaller than the first angle (α1), wherein in a part (19) which is situated adjacent the end edge (11), which part (19) extends between each of the sides (16, 17) and the center (18) of each area (15), the obliquely tapering part (13) is arranged at the first angle (α1), and in that in an adjoining part (20), which adjoining part (20) adjoins said part 19) on the side of the cylindrical part (14) of the socket end part, the obliquely tapering part (13) is arranged at the second angle (α2), and in that the axial length (l) of the adjoining part (20) arranged at the second angle (α2) gradually increases from each of the sides (16, 17) towards the center (18) of the area (15).

5. Assembly according to claim 4, in which an adjoining part (20)—at the center (18) of the area (15)—adjoins the free edge (11) of the socket end part (1).

6. Assembly according to claim 5, in which the obliquely tapering part (13) is at the first angle (α1) relative to the center axis (12) in areas (21) that are located between neighboring areas (15) when seen in circumferential direction.

* * * * *